United States Patent
Ohnishi et al.

(10) Patent No.: US 9,290,171 B2
(45) Date of Patent: Mar. 22, 2016

(54) ELECTRIC BRAKE ACTUATOR, AND BRAKE SYSTEM FOR VEHICLE

(75) Inventors: Takaaki Ohnishi, Saitama (JP); Kunimichi Hatano, Saitama (JP); Kazuyoshi Akutsu, Saitama (JP); Arata Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 379 days.

(21) Appl. No.: 13/885,176

(22) PCT Filed: Nov. 17, 2011

(86) PCT No.: PCT/JP2011/076528
§ 371 (c)(1),
(2), (4) Date: May 14, 2013

(87) PCT Pub. No.: WO2012/067187
PCT Pub. Date: May 24, 2012

(65) Prior Publication Data
US 2013/0239567 A1      Sep. 19, 2013

(30) Foreign Application Priority Data

Nov. 17, 2010   (JP) .................................. 2010-257204

(51) Int. Cl.
| | |
|---|---|
| B60T 13/74 | (2006.01) |
| B60T 7/04 | (2006.01) |
| B60T 8/40 | (2006.01) |
| B60T 13/66 | (2006.01) |
| B60T 8/1755 | (2006.01) |

(52) U.S. Cl.
CPC .............. *B60T 13/745* (2013.01); *B60T 7/042* (2013.01); *B60T 8/1755* (2013.01); *B60T 8/4081* (2013.01); *B60T 13/662* (2013.01)

(58) Field of Classification Search
CPC ..................................................... B60T 13/745
See application file for complete search history.

(56) References Cited

U.S. PATENT DOCUMENTS

| 4,653,815 A | 3/1987 | Agarwal et al. |
| 4,852,419 A * | 8/1989 | Kittel et al. .................. 74/89.14 |
| 5,236,257 A | 8/1993 | Monzaki et al. |

(Continued)

FOREIGN PATENT DOCUMENTS

| EP | 0 448 031 A1 | 9/1991 |
| EP | 0 699 571 A1 | 3/1996 |

(Continued)

OTHER PUBLICATIONS

Extended European Search Report issued Apr. 9, 2014 in the corresponding EP Patent Application 11841219.6.

(Continued)

*Primary Examiner* — F. Daniel Lopez
(74) *Attorney, Agent, or Firm* — Carrier Blackman & Associates, P.C.; Joseph P. Carrier; Jeffrey T. Gedeon (57) ABSTRACT

A motor cylinder device (16) is configured with a cylinder mechanism (76) provided with first and second slave pistons that are displaced along a hydraulic pressure chamber; an electric motor (72) for driving first and second slave pistons; and an actuator housing (75) formed separable from the cylinder mechanism (76), wherein the actuator housing houses a gear mechanism for transmitting a rotational driving force of the electric motor (72), and a conversion mechanism for converting the rotational driving force transmitted through the gear mechanism, into a linear movement and transmitting the linear movement to the piston.

3 Claims, 8 Drawing Sheets

(56) References Cited

U.S. PATENT DOCUMENTS

| | | | |
|---|---|---|---|
| 5,658,056 A | 8/1997 | Rischen et al. | |
| 6,000,517 A * | 12/1999 | Imao | 192/85.59 |
| 8,226,176 B2 | 7/2012 | Hatano | |
| 2003/0061812 A1 | 4/2003 | Enomoto et al. | |

FOREIGN PATENT DOCUMENTS

| | | |
|---|---|---|
| EP | 1 970 271 A1 | 9/2008 |
| JP | 4-166463 A | 6/1992 |
| JP | H06-183330 A | 7/1994 |
| JP | 8-192733 A | 7/1996 |
| JP | 10-194112 A | 7/1998 |
| JP | 11-217068 A | 8/1999 |
| JP | 2008-100563 A | 5/2008 |
| JP | 2010-095023 A | 4/2010 |

OTHER PUBLICATIONS

Office Action issued Oct. 24, 2014 for corresponding Chinese patent application 201180054704.1.

* cited by examiner

ELECTRIC BRAKE ACTUATOR, AND BRAKE SYSTEM FOR VEHICLE

TECHNICAL FIELD

The present invention relates to an electric brake actuator, for example, built in a brake system for a vehicle, and a brake system for a vehicle.

BACKGROUND ART

Conventionally, as a brake mechanism for a vehicle, for example, servo units using a negative pressure booster or a hydraulic booster are known. As this kind of a servo unit, in recent years, electric servo units using an electric motor as boosting sources have been disclosed (for example, see Patent Document 1).

The electric servo unit disclosed in this Patent Document 1 is configured as an integrated unit including a main piston that is advanced and retreated by operation of a brake pedal, a cylindrical booster piston that is fitted outside the main piston relatively displaceably, and an electric motor for moving forward and backward the booster piston.

In this case, the main piston and the booster piston are arranged as the pistons for a master cylinder, and the respective front ends are located in the pressure chamber of the master cylinder. Therein, an input thrust force applied to the main piston from a brake pedal and a booster thrust force applied from an electric motor to the booster piston generate a brake hydraulic pressure in the master cylinder.

BACKGROUND ART DOCUMENT

Patent Document

Patent Document 1: JP2010-23594 A

DISCLOSURE OF THE INVENTION

Problems to be Solved by the Invention

However, for the electric servo unit disclosed by Patent Document 1, a fluid pressure generation mechanism for generating a fluid pressure by a force that is input from the brake pedal and another fluid pressure generation mechanism for generating a fluid pressure by a force that is input from the electric motor are integrally configured. Consequently, the entire device size tends to be large, and a problem is caused that the device lacks versatility in manufacturing.

The present invention has been developed in the above-described point of view, and aims to provide an electric brake actuator and a brake system for a vehicle, wherein downsizing of the entire device and improvement in versatility are possible.

Means for Solving the Problems

To achieve the aim the present invention provides an electric brake actuator for generating a brake hydraulic pressure, based on an electric signal according to a braking operation, comprising: a cylinder provided with a piston that is displaced along a hydraulic pressure chamber: an electric motor configured to drive the piston; and an actuator housing formed separable from the cylinder, wherein the actuator housing houses a gear mechanism configured to transmit a rotational driving force of the electric motor, and a conversion mechanism configured to convert the rotational driving force transmitted through the gear mechanism, into a linear movement and transmit the linear movement to the piston.

According to the present invention, by constructing the electric brake actuator by three members that are a cylinder, an electric motor, and an actuator housing, a desired brake pressure can be generated with a simple structure, the entire device can be downsized, and the versatility can be improved.

In addition, the present invention provides the actuator housing including a mount portion configured to be mounted and to support the electric brake actuator.

According to the invention, the actuator housing can be stably supported through the mount portion provided at the actuator housing, and the actuator housing can be easily fitted to another member, for example, the vehicle body frame. In this case, by forming the mount portion, for example, by a first boss portion and a second boss portion protruding toward the left and right sides along a direction substantially perpendicular to the axial line of the cylinder, and a third boss portion protruding downward with respect to the cylinder, it is possible to further stably support the actuator housing at three points.

The present invention provides the electric brake actuator, wherein the actuator housing is configured to be divisible in two on a plane substantially orthogonal with an axial line of the cylinder as a dividing plane.

According to the invention, the fastening direction by a plurality of fastening members, such as bolts, can be set parallel to the axial line direction of the cylinder. The fitting task of the actuator housing with a divided structure can thereby be easily carried out.

The present invention provides a brake system for a vehicle, generating a brake hydraulic pressure based on an electric signal according to a braking operation, comprising: a cylinder provided with a piston that is displaced along a hydraulic pressure chamber: an electric motor configured to drive the piston; and an actuator housing formed separable from the cylinder, wherein the actuator housing houses a gear mechanism configured to transmit a rotational driving force of the electric motor, and a conversion mechanism configured to convert the rotational driving force transmitted through the gear mechanism, into a linear movement and transmit the linear movement to the piston.

According to the invention, it is possible to obtain a vehicle brake system provided with a motor cylinder device that is capable of generating a desired brake pressure with a simple structure and enables downsizing of the entire device and improvement in the versatility.

Advantageous Effect of the Invention

According to the present invention, it is possible to obtain an electric brake actuator and a brake system for a vehicle, wherein downsizing of the entire device and improvement in versatility are possible.

EMBODIMENT FOR CARRYING OUT THE INVENTION

Figure 1:
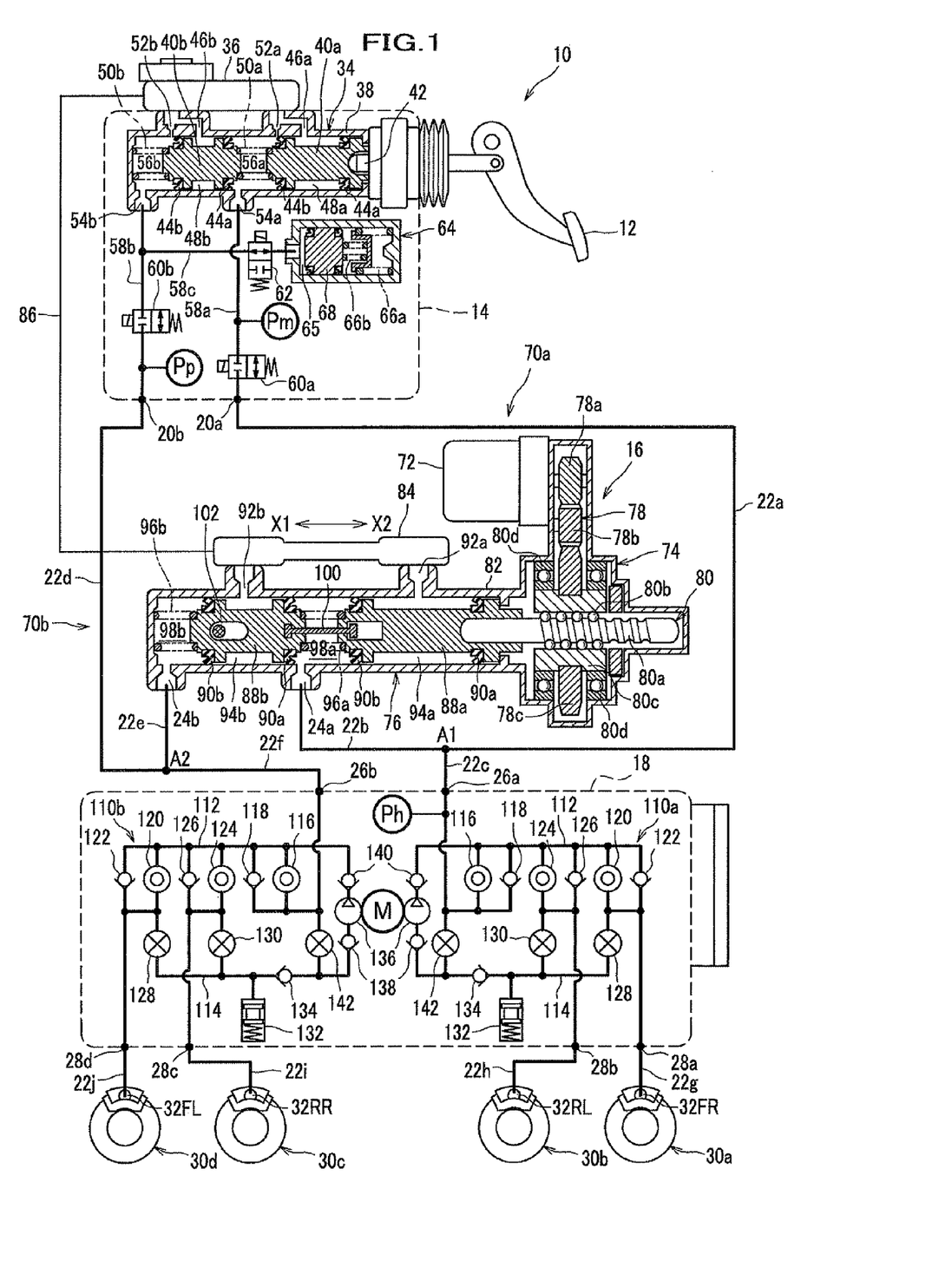
FIG. 1 shows a schematic configuration of a vehicle brake system in which a motor cylinder device in an embodiment according to the invention is built.

An embodiment according to the present invention will be described below, referring to the drawings, as appropriate. FIG. 1 shows a schematic configuration of a vehicle brake system in which a motor cylinder device in the present embodiment according to the invention is built.

A vehicle brake system 10 shown in FIG. 1 includes two brake systems that are a brake system of a by-wire type for a general operation, which operates a brake by transmitting an electric signal and a brake system of a conventional hydraulic type for fail-safe, which operates a brake by transmitting a hydraulic pressure.

Accordingly, as shown in FIG. 1, the vehicle brake system 10 basically has a structure in which there are individually provided an input device 14 for inputting an operation of a brake pedal 12 upon operation by an operator, a motor cylinder device 16 for controlling the brake hydraulic pressure, and a vehicle stability assist device 18 (hereinafter referred to as the VSA device 18, VSA: trade mark) for assisting stabilization of vehicle behavior.

These devices, namely, the input device 14, the motor cylinder device 16, and the VSA device 18 are connected by hydraulic passages formed by a tube material, for example, a hose or a tube. Further, as a by-wire brake system, the input device 14 and the motor cylinder device 16 are electrically connected by a harness, not shown.

Regarding the hydraulic passage, a connection point A1 in FIG. 1 being defined as a reference, a connection port 20a of the input device 14 and the connection point A1 are connected by a first piping tube 22a. Further, an output port 24a of the motor cylinder device 16 and the connection point A1 are connected by a second piping tube 22b. Further, an inlet port 26a of the VSA device 18 and the connection point A1 are connected by a third piping tube 22c.

With another connection point A2 in FIG. 1 as a reference, another connection port 20b of the input device 14 and the connection point A2 are connected by a fourth piping tube 22d. Further, another output port 24b of the motor cylinder device 16 and the connection point A2 are connected by a fifth piping tube 22e. Still further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with a wheel cylinder 32FR of a disk brake mechanism 30a provided at the front wheel on the right side. The second outlet port 28b is connected, by an eighth piping tube 22h, with a wheel cylinder 32RL of a disk brake mechanism 30b provided at the rear wheel on the left side. The third outlet port 28c is connected, by a ninth piping tube 22i, with a wheel cylinder 32RR of a disk brake mechanism 30c provided at the rear wheel on the right side. The fourth outlet port 28d is connected, by a tenth piping tube 22j, with a wheel cylinder 32FL of a disk brake mechanism 30d provided at the front wheel on the left side.

In this case, brake fluid is supplied through the piping tubes 22g-22j connected with the respective outlet ports 28a-28d to the respective wheel cylinders 32FR, 32RL, 32RR, and 32FL of the disk brake mechanisms 30a-30d. A rise in the fluid pressure in the wheel cylinders 32FR, 32RL, 32RR, or 32FL operates the wheel cylinders 32FR, 32RL, 32RR, or 32FL, and a braking force is applied to the corresponding wheel (the right-side front wheel, the left-side rear wheel, the right-side rear wheel, or the left-side front wheel).

The vehicle brake system 10 is arranged to be mountable on various vehicles including, for example, a vehicle driven only by an engine (internal combustion engine), a hybrid vehicle, an electric vehicle, and a fuel cell vehicle.

The input device 14 includes a tandem master cylinder 34 capable of generating a fluid pressure by a driver's (operator's) operation of the brake pedal 12 and a first reservoir 36 provided at the master cylinder 34. Inside a cylinder tube 38 of the master cylinder 34, two pistons 40a and 40b are slidably arranged, wherein the two pistons 40a and 40b are separated from each other with a certain distance along the axial direction of the cylinder tube 38. The one piston 40a is disposed adjacent to the brake pedal 12 and is connected with the brake pedal 12 through a push rod 42 to be directly moved. The other piston 40b is disposed with a longer distance than the piston 40a from the brake pedal 12.

A pair of piton packings 44a and 44b are respectively attached to the outer circumferential surfaces of the one and the other pistons 40a and 40b through an annular stepped portion. Back chambers 48a and 48b communicated with later-described supply ports 46a and 46b are formed between the pair of packings 44a and 44b. Further, a spring member 50a is arranged between the one and the other pistons 40a and 40b. Another spring member 50b is arranged between the other piston 40b and the side end portion of the cylinder tube 38. Incidentally, the pair of piston packings 44a and 44b may be attached to the inner wall side of the cylinder tube 38 through an annular groove.

The cylinder tube 38 of the master cylinder 34 is provided with two supply ports 46a and 46b, two relief ports 52a and 52b, and two output ports 54a and 54b. In this case, the respective supply ports 46a (46b), and the respective relief ports 52a (52b), are arranged to respectively join with each other and communicate with a reservoir chamber, not shown, in the first reservoir 36.

Further, inside the cylinder tube 38 of the master cylinder 34, a first pressure chamber 56a and a second pressure chamber 56b are provided to generate a brake hydraulic pressure corresponding to a braking effort applied by the driver to the brake pedal 12. The first pressure chamber 56a is arranged such as to communicate with the connection port 20a through a first hydraulic passage 58a. The second pressure chamber 56b is arranged such as to communicate with the other connection port 20b through a second hydraulic passage 58b.

A pressure sensor Pm is provided between the master cylinder 34 and the connection port 20a and on the upstream side of the first hydraulic passage 58a. A first shut-off valve 60a of a solenoid valve of a normally open type is provided on the downstream side of the first hydraulic passage 58a. This pressure sensor Pm detects the fluid pressure on the upstream side, which is on a side of the master cylinder 34 of the first shut-off valve 60a, on the first hydraulic passage 58a.

Between the master cylinder 34 and the other connection port 20b, a second shut-off valve 60b of a solenoid valve of a normally open type is arranged on the upstream side from the second hydraulic passage 58b, and a pressure sensor Pp is arranged on the downstream side from the second hydraulic passage 58b. On the second hydraulic passage 58b, this pressure sensor Pp detects the fluid pressure on the downstream side from the second shut-off valve 60b, in other words, on the side of the wheel cylinders 32FR, 32RL, 32RR, and 32FL with respect to the second shut-off valve 60b.

The normal openness of the first shut-off valve 60a and the second shut-off valve 60b refers to the type of a valve configured such that the normal position (the position of the valve body when current is not applied) is in a state of being at an open position (always open). Incidentally, in FIG. 1, the first shut-off valve 60a and the second shut-off valve 60b are shown in a close state in which a current is applied to the solenoids, and the valve bodies, not shown, are thereby operating.

At a point between the master cylinder 34 and the second shut-off valve 60b, the second hydraulic passage 58b is provided with a branched hydraulic passage 58c branching from the second hydraulic passage 58b. Serially connected to the branched hydraulic passage 58c are a third shut-off valve 62 of a solenoid valve of a normally close type and a stroke simulator 64. The normal closing of the third shut-off valve 62 refers to the type of a valve configured such that the normal position (the position of the valve body when current is not applied) is in a state of being at a closed position (always closed). Incidentally, in FIG. 1, the third shut-off valve 62 is shown in a valve open state in which a current is applied to the solenoid, and the valve body, not shown, is thereby operating.

The stroke simulator 64 is a device that makes an operator feel as if a braking force were generated by a braking effort, by generating a stroke and a reaction force of the brake during by-wire control. The stroke simulator 64 is disposed on the second hydraulic passage 58b and on a side of the master cylinder 34 of the second shut-off valve 60b. The stroke simulator 64 is provided with a hydraulic pressure chamber 65 communicating with the branched hydraulic passage 58c, and is arranged such as to be able to suck brake fluid let out through the hydraulic pressure chamber 65 from the second pressure chamber 56b of the master cylinder 34.

Further, the stroke simulator 64 includes a first return spring 66a with a larger spring constant, a second return spring 66b with a smaller spring constant, the first and the second springs 66a and 66b being serially disposed with each other, and a simulator piston 68 pressurized by the first and second return springs 66a and 66b. The stroke simulator 64 is arranged such that the increase gradient of the pedal reaction force is set low during an early stage of pedaling the brake pedal 12, and the pedal react ion force is set high during a later stage of pedaling, so that the pedal feeling of the brake pedal 12 becomes equivalent to an existing master cylinder.

The configuration of the hydraulic passages is roughly categorized into a first fluid pressure system 70a that connects the first pressure chamber 56a of the master cylinder 34 and the plurality of wheel cylinders 32FR and 32RL, and a second fluid pressure system 70b that connects the second pressure chamber 56b of the master cylinder 34 and the plurality of wheel cylinders 32RR and 32FL.

The first fluid pressure system 70a is configured by the first hydraulic passage 58a connecting the output port 54a of the master cylinder 34 (cylinder tube 38) of the input device 14 and the connection port 20a, the piping tubes 22a and 22b connecting the connection port 20a of the input device 14 and the output port 24a of the motor cylinder device 16, the piping tubes 22b and 22c connecting the output port 24a of the motor cylinder device 16 and the inlet port 26a of the VSA device 18, and the piping tubes 22g and 22h connecting the outlet ports 28a and 28b of the VSA device 18 and the respective wheel cylinders 32FR and 32RL.

The second fluid pressure system 70b includes the second hydraulic passage 58b connecting the output port 54b of the master cylinder 34 (cylinder tube 38) of the input device 14 and the other connection port 20b, the piping tubes 22d and 22e connecting the other connection port 20b of the input device 14 and the output port 24b of the motor cylinder device 16, the piping tubes 22e and 22f connecting the output port 24b of the motor cylinder device 16 and the inlet port 26b of the VSA device 18, and the piping tubes 22i and 22j for connecting the outlet ports 28c and 28d of the VSA device 18 and the respective wheel cylinders 32RR and 32FL.

As a result, because the hydraulic passages are formed with the first fluid pressure system 70a and the second fluid pressure system 70b, the respective wheel cylinders 32FR and 32RL, and the respective wheel cylinders 32RR and 32FL, can be independently operated so that braking forces which are independent from each other can be generated.

Figure 2:
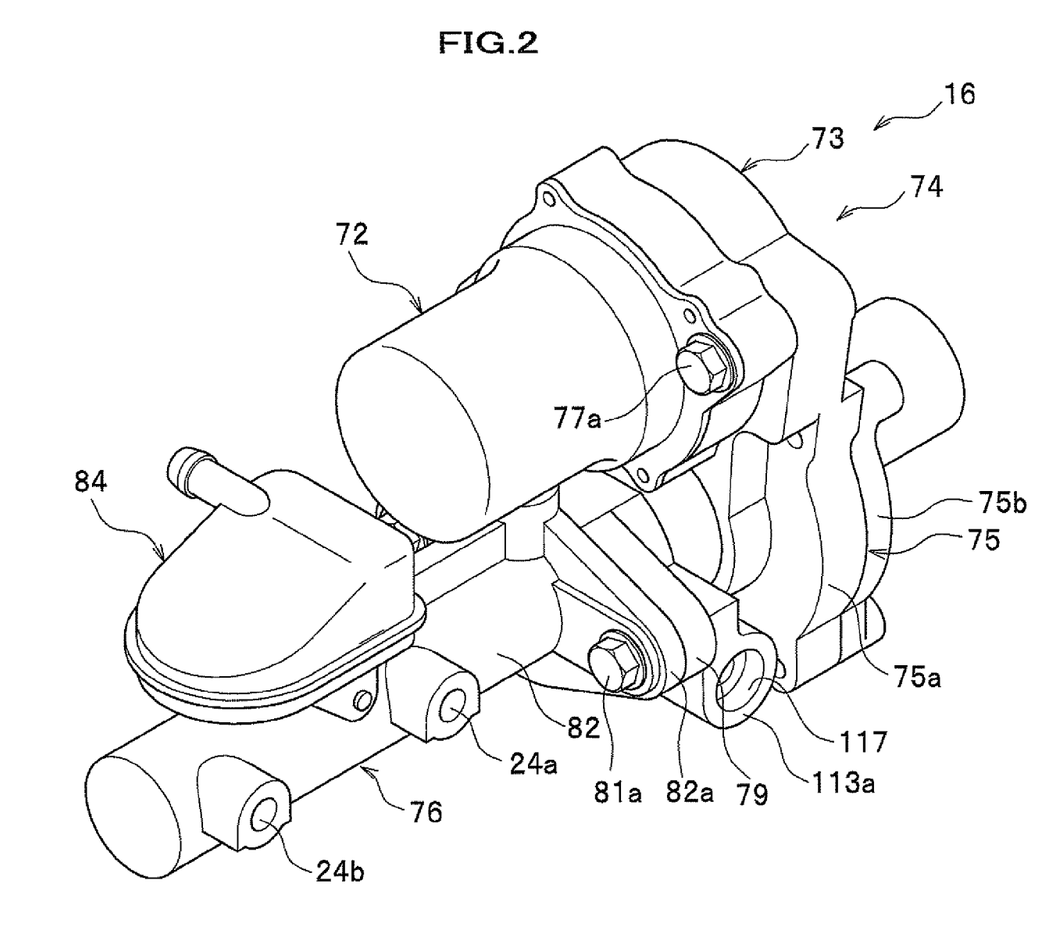
FIG. 2 is a perspective view of the motor cylinder device shown in FIG. 1.
Figure 3:
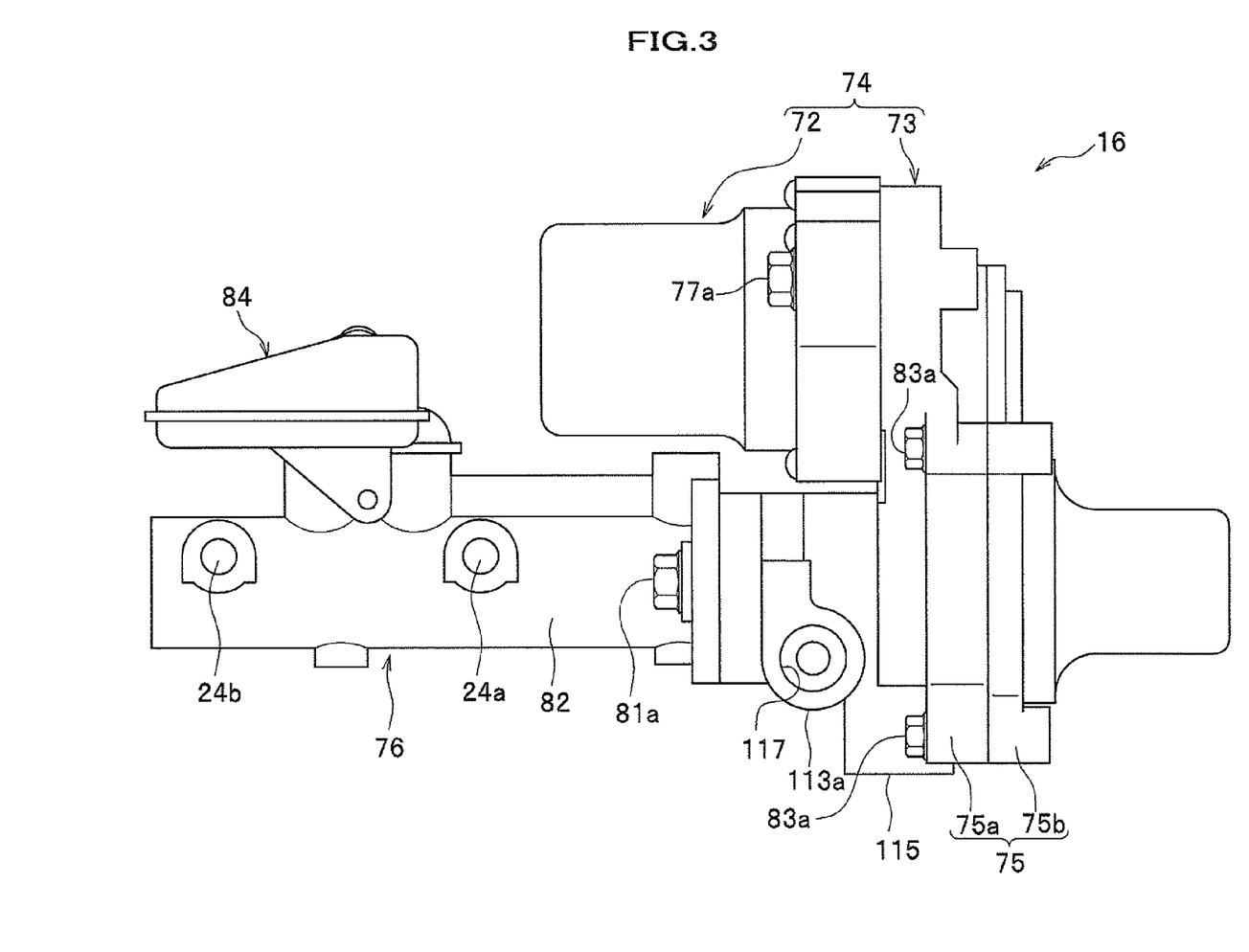
FIG. 3 is a side view of the motor cylinder device.
Figure 4:
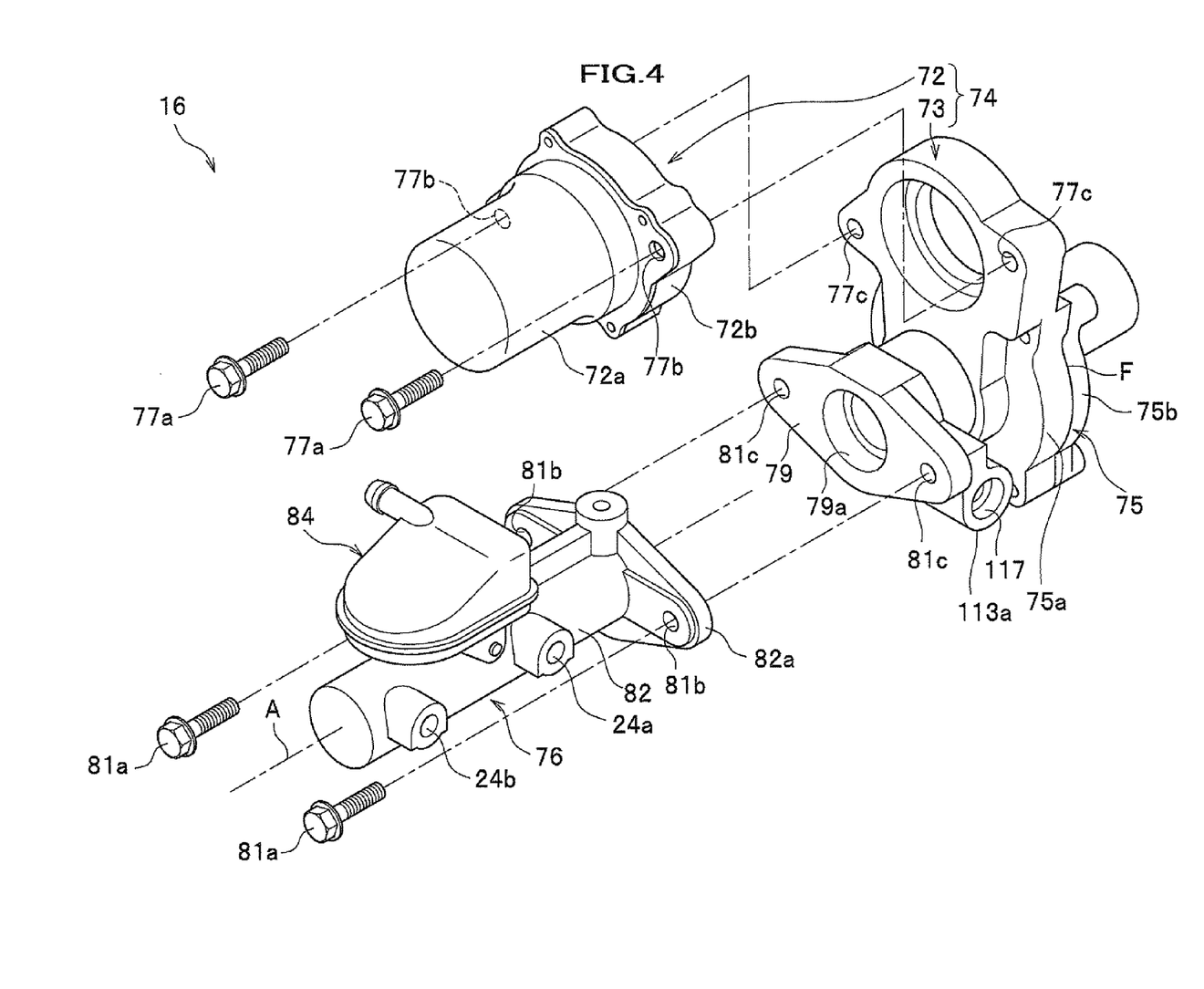
FIG. 4 is an exploded perspective view of the motor cylinder device.
Figure 5:
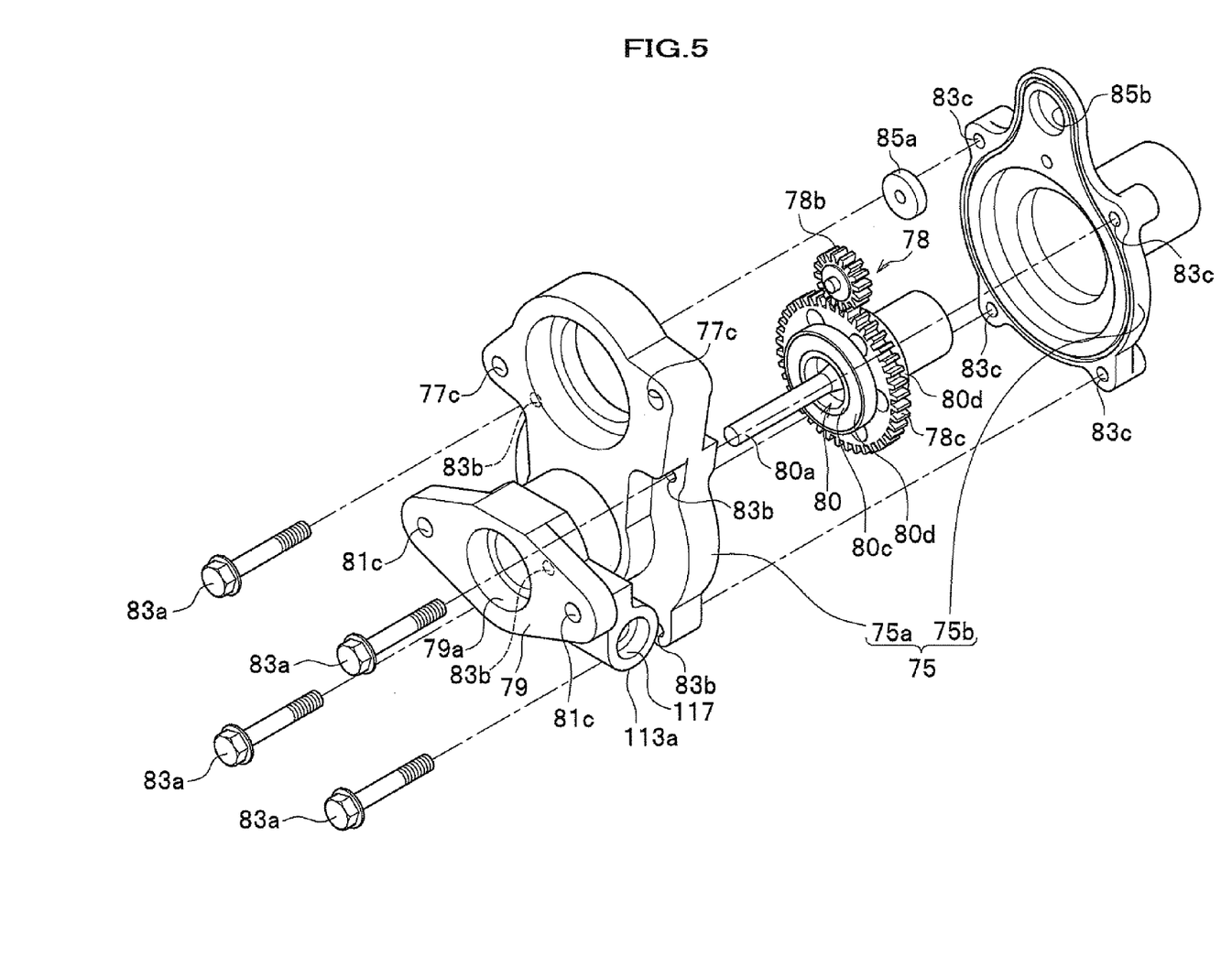
FIG. 5 is an exploded perspective view of a driving force transmission section of the motor cylinder device.
Figure 6:
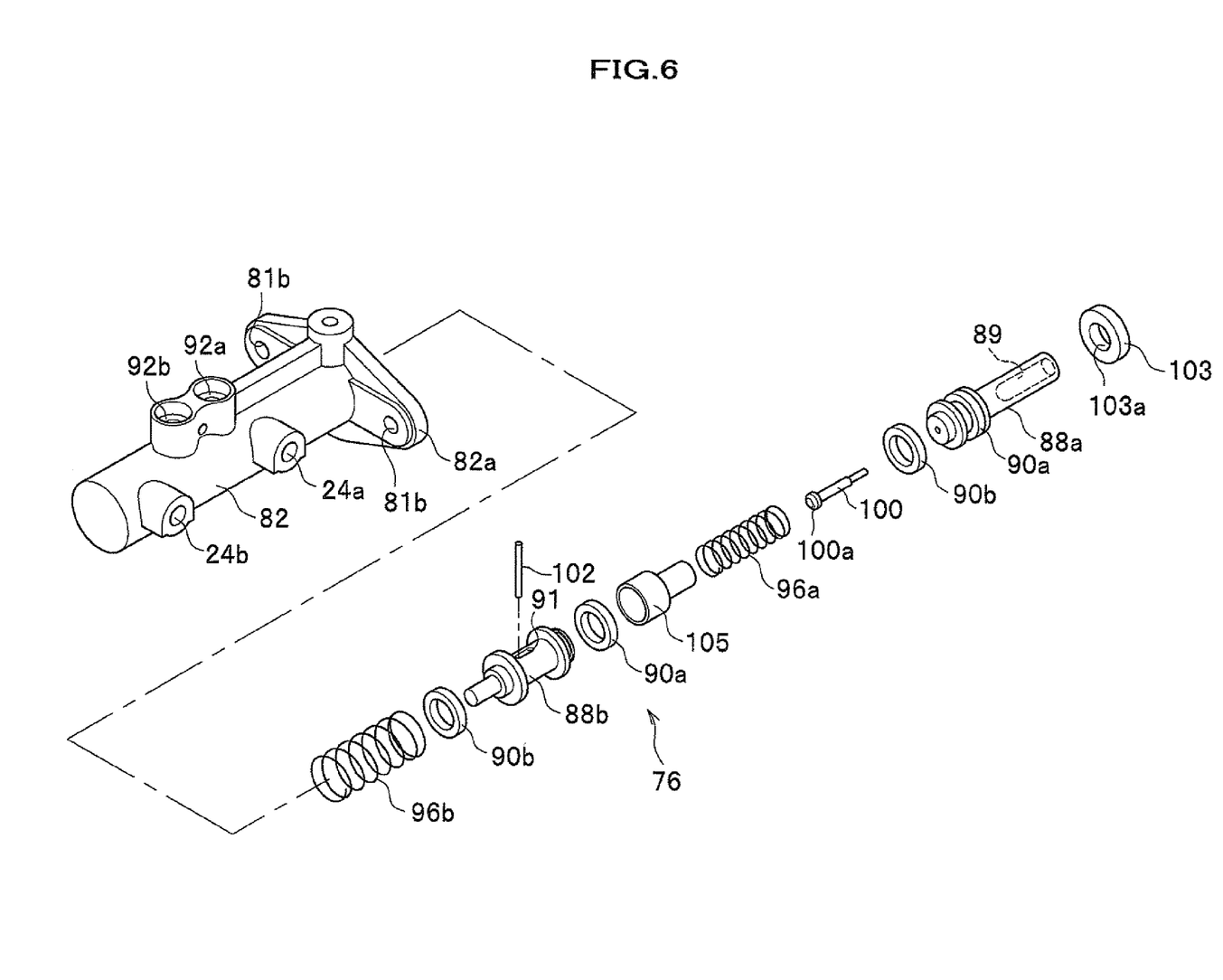
FIG. 6 is an exploded perspective view of a cylinder mechanism of the motor cylinder mechanism.

FIG. 2 is a perspective view of the motor cylinder device shown in FIG. 1. FIG. 3 is a side view of the motor cylinder device. FIG. 4 is an exploded perspective view of the motor cylinder device. FIG. 5 is an exploded perspective view of a driving force transmission section constructing the motor cylinder device. FIG. 6 is an exploded perspective view of a cylinder mechanism constructing the motor cylinder device.

The motor cylinder device 16 that functions as an electric brake actuator includes, as shown in FIG. 2, an actuator mechanism 74 having an electric motor 72 and a driving force transmission section 73, and a cylinder mechanism 76 driven by the actuator mechanism 74. In this case, as shown in FIG. 4, the electric motor 72, the driving force transmission section 73, and the cylinder mechanism 76 are arranged to be separable from each other.

Further, the driving force transmission section 73 of the actuator mechanism 74 includes a gear mechanism (decelerating mechanism) 78 for transmitting the rotational driving force of the electric motor 72, and a ball screw assembly (conversion mechanism) 80 that converts this rotational driving force into linear movement (axial force along a linear direction) and transmits the linear movement to a side of a later-described slave pistons 88a and 88b of the cylinder mechanism 74.

The electric motor 72 is subjected to drive control, based on a control signal (electric signal) from control means, not shown. The electric motor 72 is, for example, a servomotor and is disposed above the actuator mechanism 74. Accordingly, it can be favorably avoided that oil component, such as grease, in the driving force transmission section 73 enters inside the electric motor 72 by gravity action.

The electric motor 72 is configured with a motor casing 72a formed in a sleeve shape having a bottom and a base portion 72b to which a harness, not shown, is connected, the base portion 72b being integrally joined with the motor casing 72a. The base portion 72b is provided with a plurality of insertion holes 77b which screw members 77a penetrate through, and the electric motor 72 is fastened to a later-described actuator housing 75 through the screw members 77a.

The driving force transmission section 73 has the actuator housing 75, and mechanical elements, such as the gear mechanism (deceleration mechanism) 78 and the ball screw assembly (conversion mechanism) 80, for driving force transmission are housed in the space portion inside the actuator housing 75. As shown in FIG. 5, the actuator housing 75 has a structure that can be divided into a first body 75a disposed on a side of the cylinder mechanism 76 and a second body 75b that closes an opening end on the side opposite to the cylinder mechanism 76 with respect to the first body 75a.

As shown in FIG. 4, a pair of screw holes 77c is provided on the upper side of the first body 75a to mount the electric motor 72 to the driving force transmission section 73, and the electric motor 72 is fixed by fastening the pair of the screws 77a to the screw holes 77c. Further, a flange portion 79 substantially in a rhombic shape is provided at the end portion of the first body 75a on a side of the cylinder mechanism 76, and a pair of screw holes 81c is provided at the flange portion 79 to fit an opening portion 79a substantially in a circular shape and the cylinder mechanism 76. In this case, a pair of screw members 81a penetrating through insertion holes 81b of a flange portion 82a provided on the other end of a later-described cylinder main body 82 are screw-engaged with the screw holes 81c, and the cylinder mechanism 76 and the driving force transmission section 73 are thereby integrally joined.

As shown in FIG. 5, the gear mechanism 78 and the ball screw assembly 80 are housed between the first body 75a and the second body 75b. The gear mechanism 78 includes a pinion gear 78a (see FIG. 1) being in a small diameter and engaged with the output shaft of the electric motor 72, an idle gear 78b in a small diameter engaging with the pinion gear 78a, and a ring gear 78c in a large diameter engaging with the idle gear 78b.

The ball screw assembly 80 includes: a ball screw shaft 80a whose one end is joined with the first slave piston 88a of the cylinder mechanism 76; a plurality of balls 80b (see FIG. 1) that rollingly move along a thread groove in a scrolled shape formed on the outer circumferential surface of the ball screw shaft 80a; a nut member 80c that is substantially in a sleeve shape, fitted inside the ring gear 78c to integrally rotate with the ring gear 78c, and threadly engaged with the balls 80b; and a pair of ball bearings 80d that rotatably and axially support the one end side and the other end side of the nut member 80c along the axial direction. Incidentally, the nut member 80c is fixed to the inner diameter surface of the ring gear 78c, for example, by pressure fitting.

The driving force transmission section 73 is configured as described above and thus, after the rotational driving force of the electric motor 72 transmitted through the gear mechanism 78 is input to the nut member 80c, the driving force transmission section 73 converts, by the ball screw assembly 80, the driving force into a linear axial force (linear movement) to have a forward and backward motion to cause the ball screw shaft 80a to move along the axial direction.

The first body 75a and the second body 75b of the actuator housing 75 are arranged such as to be integrally joined through four bolts 83a and also to be separable from each other. The first body 75a is provided with insertion holes 83b through which the four bolts 83a penetrate, and the second body 75b is provided with screw holes 83c at positions corresponding to the insertion holes 83, wherein the thread portions of the bolts 83a are screw-inserted in the screw holes 83c.

In this case, the thread portions of the bolts 83a penetrating through the insertion holes 83b of the first body 75a are screw-inserted into the screw holes 83c of the second body 75b, and the first body 75a and the second body 75b are thereby integrally fastened. Incidentally, a circular recession 85b is provided on the upper side of the second body second body 75b, and a bearing 85a is attached to the circular recession 85b to axially and rotatably support the tip end portion of the output shaft of the electric motor 72.

In the present embodiment, with a plane that is substantially perpendicular to the axial line A of the cylinder main body 82 of the cylinder mechanism 76 as a dividing plane F (see FIG. 4), the actuator housing 75 has a divided structure with the first body 75a and the second body 75b, and the fastening direction of the plural bolts 83a (see FIG. 5) are thus parallel to the axial line A of the cylinder main body 82. As a result, in the present embodiment, the fitting task can be easily carried out.

The cylinder mechanism (cylinder) 76 includes the cylinder main body 82 in a cylindrical shape with a bottom and a second reservoir 84 arranged at the cylinder main body 82. The second reservoir 84 is connected by a piping tube 86 with the first reservoir 36 arranged at the master cylinder 34 of the input device 14. Brake fluid reserved in the first reservoir 36 is supplied to the second reservoir 84 through the piping tube 86.

As shown in FIG. 1 and FIG. 6, the first slave piston (piston) 88a and the second slave piston (piston) 88b are slidably arranged inside the cylinder main body 82, wherein the slave pistons 88a and 88b are separated from each other with a certain distance along the axial direction of the cylinder main body 82. The first slave piston 88a is disposed adjacent to a side of the ball screw assembly 80, is in contact with one end portion of the ball screw shaft 80a through a connection hole 89, and is displaced in the direction arrow X1 or X2 integrally with the ball screw shaft 80a. The second slave piston 88b is disposed farther than the slave piston 88a from a side of the ball screw assembly 80.

A pair of slave piston packings 90a and 90b are attached on the outer circumferential surfaces of the first and second slave pistons 88a and 88b through an annular stepped portion. A first back chamber 94a and a second back chamber 94b are formed (see FIG. 1), which are respectively communicated with later-described reservoir ports 92a and 92b, are formed between the pair of the slave piston packings 90a and 90b. Further, a first return spring 96a is arranged between the first and second slave pistons 88a and 88b, and a second return spring 96b is arranged between the second slave piston 88b and the side end portion (bottom wall) of the cylinder main body 82.

The cylinder main body 82 of the cylinder mechanism 76 is provided with the two reservoir ports 92a and 92b and the two output ports 24a and 24b. In this case, the reservoir port 92a (92b) is arranged such as to communicate with a reservoir chamber, not shown, in the second reservoir 84.

A first hydraulic pressure chamber 98a is provided in the cylinder main body 82 to control the brake hydraulic pressure that is output from the output port 24a to a side of the wheel cylinders 32FR and 32RL. Further, a second hydraulic pressure chamber 98b is provided in the cylinder main body 82 to control the brake hydraulic pressure that is output from the other output port 24b to a side of the wheel cylinders 32RR and 32FL.

Restricting means 100 in a bolt shape is provided between the first slave piston 88a and the second slave piston 88b to restrict the maximum stroke (the maximum displacement distance) and the minimum stroke (the minimum displacement distance) of the slave piston 88a and the slave piston 88b. Further, the second slave piston 88b is provided with a stopper pin 102 that engages with a penetration hole 91 penetrating along a direction substantially perpendicular to the axial line of the second slave piston 88b, restricts the sliding range of the second slave piston 88b, and inhibits over return of the slave piston 88b to a side of the slave piston 88a. The restricting means 100 and the stopper pin 102 prevent a defect of another system at the time of a defect of one system, particularly at the time of backup when braking is carried out by a brake hydraulic pressure generated by the master cylinder 34.

Incidentally, as shown in FIG. 6, a piston guide 103 engagedly stopped by a circlip, not shown, is attached to the opening portion of the cylinder main body 82. This piston guide 103 is provided with a through hole 103a thorough which the first piston 88a can penetrate with a clearance. By sliding the rod portion of the first piston 88a along the piston guide 103, the first piston 88a in contact with one end portion of the ball screw shaft 80a can be linearly guided. Further, a connection piston 105 is connected to the second piston 88b. The connection piston 105 is provided with an engagement hole, not shown, with which a head portion 100a of the restricting means 100 formed in a bolt shape engages.

Figure 7:
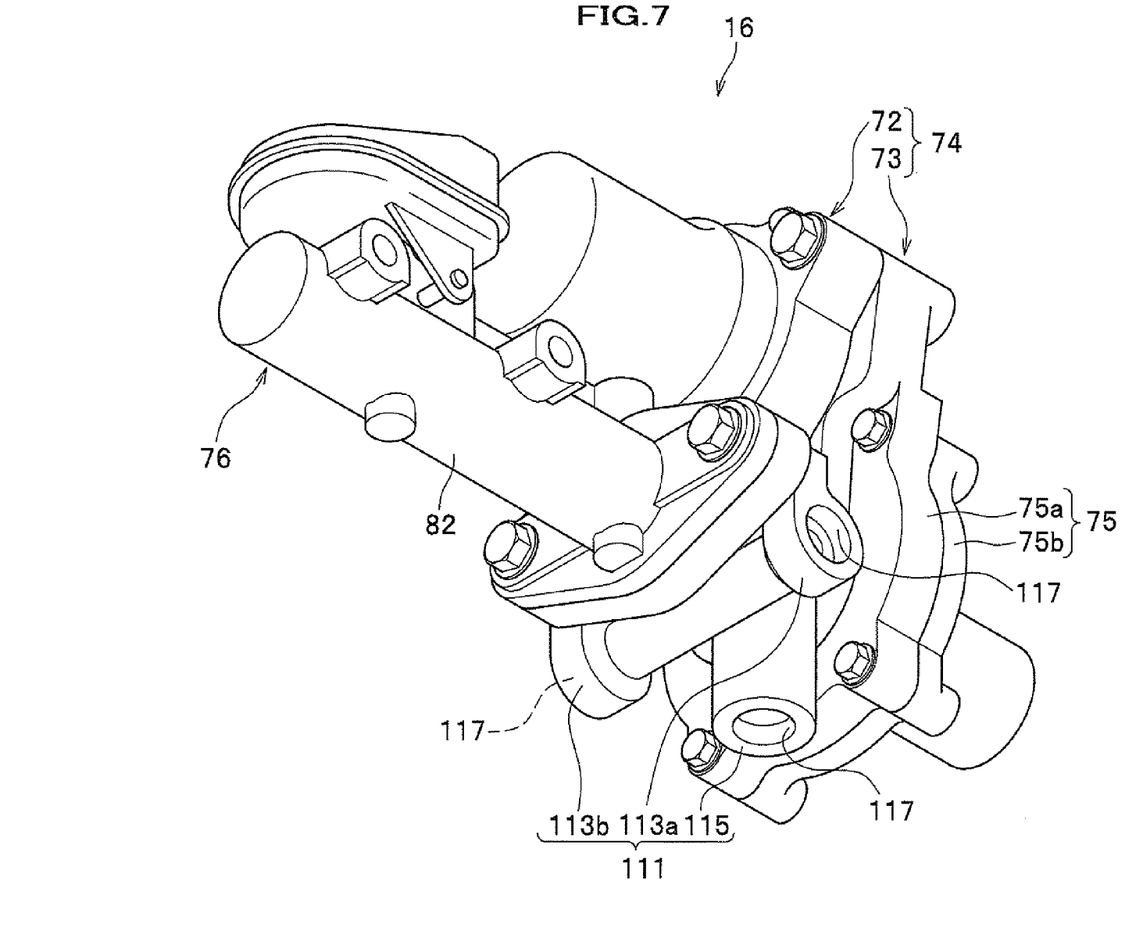
FIG. 7 is a perspective view of the motor cylinder device in a view from below.
Figure 8:
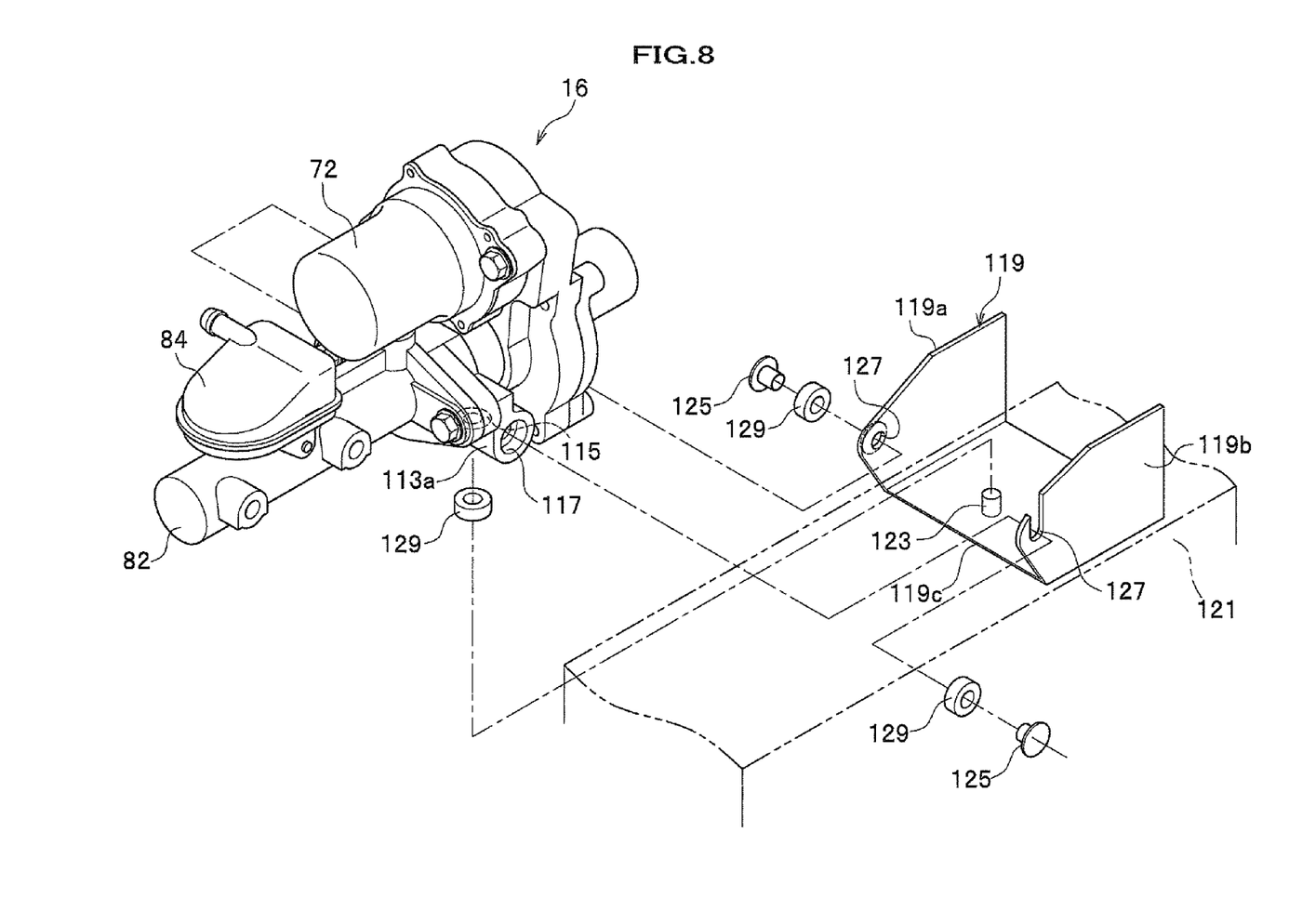
FIG. 8 is a perspective view showing a state that the motor cylinder device is fixed to a vehicle body frame through a mount portion.

FIG. 7 is a perspective view of the motor cylinder device in a view from below. FIG. 8 is a perspective view showing a state that the motor cylinder device is fixed to a vehicle body frame through a mount portion.

As shown in FIG. 7, a mount portion 111 is provided on the lower side of the actuator housing 75 (the first body 75a) to mount the motor cylinder device 16 to the vehicle body frame. This mount portion 111 includes a first boss portion 113a, a second boss portion 113b, and a third boss portion 115, and is stably supported at three points. The first boss portion 113a is disposed on the left side in a view from a side of the second body 75b, and is arranged such as to protrude in the direction substantially perpendicular to the axial line of the cylinder main body 82. The second boss portion 113b is disposed on the right side in a view from a side of the second body 75b, and is arranged such as to protrude in the direction opposite to the first boss portion 113a. The third boss portion 115 is formed in a shape protruding downward in a view from a side of the second body 75b. The first boss portion 113a, the second boss portion 113b, and the third boss portion 115 are provided with respective mount holes 117. The first boss portion 113a, the second boss portion 113b, and the third boss portion 115 are formed integrally with the first body 75a, for example, by die-casting using a light metal material, such as an aluminum alloy.

As shown in FIG. 8, the motor cylinder device 16 is fitted through a fitting bracket 119 to the vehicle body, for example, at a front side frame 121 of the vehicle body.

This fitting bracket 119 is formed by a bottom plate 119c having a protruding portion 123 that is attached to the mount hole 117 of the third boss portion 115, and a pair of side plates 119a and 119b that support the first boss portion 113a and the second boss portion 113b of the motor cylinder device 16, sandwiching them in the left-right horizontal direction. The pair of the side plates 119a and 119b are provided with respective engaging-stop portions 127 to engagingly stop screw members 125 which are respectively inserted in the mount holes 117 of the first boss portion 113a and the second boss portion 113b. Incidentally, buffing members 129 are intermediately arranged respectively between the side plate 119a and the screw member 125, between the side plate 119b and the screw member 125, and between the protruding portion 123 of the a bottom plate 119c and the third boss portion 115.

Returning to FIG. 1, the VSA device 18 includes a generally known component and includes a first brake system 110a for control of the first fluid pressure system 70a connected to the disk brake mechanisms 30a and 30b (wheel cylinders 32FR and 32RL) for the right-side front wheel and the left-side rear wheel. Further, the VSA device 18 includes a second brake system 110b for control of the second fluid pressure system 70b connected to the disk brake mechanisms 30c and 30d (wheel cylinders 32RR and 32FL) for the right-side rear wheel and the left-side front wheel.

Incidentally, the first brake system 110a may be formed by a fluid pressure system connected to the disk brake mechanisms arranged at the left-side front wheel and the right-side front wheel, and the second brake system 110b may be formed by a fluid pressure system connected to the disk brake mechanisms arranged at the left-side rear wheel and the right-side rear wheel. Further, the first brake system 110a may be formed by a fluid pressure system connected to the disk brake mechanisms arranged at the right-side front wheel and the right-side rear wheel on one side of the vehicle body, and the second brake system 110b may be formed by a fluid pressure system connected to the disk brake mechanisms arranged at the left-side front wheel and the left-side rear wheel on the other one side of the vehicle body.

As the first brake system 110a and the second brake system 110b have the same structure, elements corresponding between the first brake system 110a and the second brake system 110b are designated with the same reference symbols. In the following, the first brake system 110a will be mainly described while describing the second brake system 110b with bracketed notes.

The first brake system 110a (the second brake system 110b) has a first shared hydraulic passage 112 and a second shared hydraulic passage 114 shared by the wheel cylinders 32FR and 32RL (32RR and 32FL). The VSA device 18 includes a regulator valve 116, which is a normal-open type solenoid valve disposed between the inlet port 26a and the first shared hydraulic passage 112, a first check valve 118 that is arranged in parallel with the regulator valve 116 to allow the brake fluid to flow from a side of the inlet port 26a to a side of the first shared hydraulic passage 112 (while inhibiting the brake fluid from flowing from a side of the first shared hydraulic passage 112 to a side of the inlet port 26a), and a first invalve 120, which is a normally open type solenoid valve disposed between the first shared hydraulic passage 112 and the first outlet port 28a. Further, the VSA device 18 includes a second check valve 122 that allows the brake fluid to flow from a side of the first outlet port 28a to a side of the first shared hydraulic passage 112 (while inhibiting the brake fluid from flowing from the side of the first shared hydraulic passage 112 to a side of the first outlet port 28a), the second check valve 122 being arranged parallel with the first invalve 120, a second invalve 124, which is a normally open type solenoid valve disposed between the first shared hydraulic passage 112 and the second outlet port 28b, and a third check valve 126 that allows the brake fluid to flow from a side of the second outlet port 28b to the side of the first shared hydraulic passage 112 (while inhibiting the brake fluid from flowing from the side of the first shared hydraulic passage 112 to the second outlet port 28b side), the third check valve 126 being arranged parallel to the second invalve 124.

Still further, the VSA device 18 includes a first outvalve 128, which is a normally closed type solenoid valve disposed between the first outlet port 28a and the second shared hydraulic passage 114, a second outvalve 130, which is a normally closed type solenoid valve disposed between the second outlet port 28b and the second shared hydraulic passage 114, a reservoir 132 connected to the second shared hydraulic passage 114, a fourth check valve 134 that is disposed between the first shared hydraulic passage 112 and the second shared hydraulic passage 114 to allow the brake fluid to flow from a side of the second shared hydraulic passage 114 to the side of the first shared hydraulic passage 112 (while inhibiting the brake fluid from flowing from the side of the first shared hydraulic passage 112 to the side of the second shared hydraulic passage 114), a pump 136 that is disposed between the fourth check valve 134 and the first shared hydraulic passage 112 to supply the brake fluid from the side of the second shared hydraulic passage 114 to the side of the first shared hydraulic passage 112, a suction valve 138 and a discharge valve 140 provided before and after the pump 136, a motor M for driving the pump 136, and a suction valve 142 disposed between the second shared hydraulic passage 114 and the inlet port 26a.

Incidentally, in the first brake system 110a, a pressure sensor Ph is provided on the hydraulic passage adjacent to the inlet port 26a to detect the brake hydraulic pressure having been output from the output port 24a of the motor cylinder device 16 and controlled by the first hydraulic pressure chamber 98a of the motor cylinder device 16. Detection signals detected by the respective pressure sensors Pm, Pp, and Ph are introduced to control means, not shown. Further, the VSA device 18 includes a function to perform ABS control in addition to VSA control.

The vehicle brake system 10, in which the motor cylinder device 16 in the present embodiment is built, is basically configured as described above. The operation and advantages of the vehicle brake system 10 will be described below.

During normal operation when the vehicle brake system 10 normally functions, the first shut-off valve 60a and the second shut-off valve 60b, which are normally open type, are magnetically excited by applying current and thereby turn into a valve close state, and the third shut-off valve 62, which is a normally closed type solenoid valve, is excited by applying current and thereby turns into a valve open state. Accordingly, as the first fluid pressure system 70a and the second fluid pressure system 70b are shut off by the first shut-off valve 60a and the second shut-off valve 60b, it does not occur that a brake hydraulic pressure generated by the master cylinder 34 of the input device 14 is transmitted to the wheel cylinders 32FR, 32RL, 32RR, and 32FL of the disk brake mechanisms 30a-30d.

At this moment, a brake hydraulic pressure generated by the second pressure chamber 56b of the master cylinder 34 is transmitted through the branched hydraulic passage 58c and the third shut-off valve 62 in the valve open state to the hydraulic pressure chamber 65 of the stroke simulator 64. The brake hydraulic pressure supplied to the hydraulic pressure chamber 65 displaces the simulator piston 68 against the spring forces of the springs 66a and 66b, and a stroke of the brake pedal 12 is thereby allowed and a pseudo petal reaction force is generated to be applied to the brake pedal 12. As a result, a brake feeling without a strange feeling for a driver can be obtained.

In such a system state, when the control means, not shown, has detected pedaling of the brake pedal 12 by the driver, the control means drives the electric motor 72 of the motor cylinder device 16 to urge the actuator mechanism 74, and displaces the first slave piston 88a and the second slave piston 88b toward the direction arrow X1 in FIG. 1 against the spring forces of the first return spring 96a and the second return spring 96b. By the displacements of the first slave piston 88a and the second slave piston 88b, the brake hydraulic pressures inside the first hydraulic pressure chamber 98a and the second hydraulic pressure chamber 98b are increased, balancing with each other, and a desired brake hydraulic pressure is thus generated.

These brake hydraulic pressures of the first hydraulic pressure chamber 98a and the second hydraulic pressure chamber 98b in the motor cylinder device 16 are transmitted through the first invalve 120 and the second invalve 124 of the VSA device 18 which are in the valve open state, to the wheel cylinders 32FR, 32RL, 32RR, and 32FL of the disk brake mechanisms 30a-30d. By operation of the wheel cylinders 32FR, 32RL, 32RR, and 32FL, desired braking forces are applied to the respective wheels.

In other word, by the vehicle brake system 10 in the present embodiment, during a normal state when the motor cylinder device 16, which functions as a dynamic fluid pressure source, an ECU, not shown, and the like for by-wire control are operable, a so-called brake by-wire type brake system becomes active wherein in a state that communication between the master cylinder 34, which generates a brake hydraulic pressure by an operator's pedaling of the brake pedal 12, and the disk brake mechanisms 30a-30d (wheel cylinders 32FR, 32RL, 32RR, an 32FL) that brake the respective wheels are shut off by the first shut-off valve 60a and the second shut-off valve 60b, the disk brake mechanisms 30a-30d are operated by the brake hydraulic pressure generated by the motor cylinder device 16. Accordingly, the present embodiment can be suitably applied to a vehicle, such as an electric vehicle or the like, in which a negative pressure that could be caused by a conventional internal combustion engine does not exist.

On the other hand, during an abnormal state when the motor cylinder device 16 or the like is inoperable, a so-called conventional hydraulic type brake system becomes active, wherein the first shut-off valve 60a and the second shut-off valve 60b are respectively made in a valve open state, and the third shut-off valve 62 is made in a valve close state so as to transmit a brake hydraulic pressure generated by the master cylinder 34 to the disk brake mechanisms 30a-30d (wheel cylinders 32FR, 32RL, 32RR, 32FL) and thereby operate the disk brake mechanisms 30a-30d (wheel cylinders 32FR, 32RL, 32RR, and 32FL).

In the present embodiment, the motor cylinder device 16 is constructed by three members that are the cylinder mechanism 76 provided with the first and second slave pistons 88a and 88b for generating a brake hydraulic pressure, the electric motor 72, and the actuator housing 75 formed such as to house the gear mechanism 78 and the ball screw assembly 80 and to be separable from the cylinder mechanism 76. As a result, in the present embodiment, a desired brake pressure can be generated with a simple structure, and for example, it is possible to independently produce any of the three members, so that the entire device can be downsized and the versatility can be improved.

Further, in the present embodiment, the actuator housing 75 is supported by providing the mount portion 111 at the actuator housing 75 (the first body 75a), and the actuator housing 75 can thus be easily fitted to the vehicle body frame, for example, at the front side frame 121 or the like of the vehicle body frame.

Still further, in the present embodiment, with a plane that is substantially perpendicular to the axial line A of the cylinder main body 82 of the cylinder mechanism 76 as a dividing plane F (see FIG. 4), the actuator housing 75 has a divided structure with the first body 75a and the second body 75b, and the fastening direction of the plural bolts 83a is thus parallel to the axial line A of the cylinder main body 82. As a result, the fitting task can be easily carried out.

Incidentally, in the present embodiment, it is possible to obtain a vehicle brake system 10 provided with the motor cylinder device 16 that is capable of generating a desired brake pressure with a simple structure and enables downsizing of the entire device and improvement in the versatility. This vehicle can be, for example, a four wheel drive vehicle (4WD), a front wheel drive vehicle (FF), a rear wheel drive vehicle (FR), or the like.

DESCRIPTION OF REFERENCE SYMBOLS

10 . . . vehicle brake system
16 . . . motor cylinder device (electric brake actuator)
72 . . . electric motor 75 ... actuator housing
75a ... first body
75b ... second body
76 ... cylinder mechanism (cylinder)
78 ... gear mechanism
80 ... ball screw assembly (conversion mechanism)
88a, 88b ... slave piston (piston)
98a, 98b ... hydraulic pressure chamber
111 ... mount portion

The invention claimed is:

1. An electric brake system, comprising:
a master cylinder configured to generate a master cylinder pressure according to a braking operation by a driver, and generate a brake hydraulic pressure, based on an electric signal according to the braking operation; and
an electric brake actuator that is communicated and connected with the master cylinder, the electric brake actuator comprising:
a cylinder mechanism provided with a piston that is displaced along a hydraulic pressure chamber:
an electric motor configured to drive the piston; and
an actuator housing formed separable from the cylinder mechanism, wherein the actuator housing houses a gear mechanism configured to transmit a rotational driving force of the electric motor, and a conversion mechanism configured to convert the rotational driving force transmitted through the gear mechanism, into a linear movement and transmit the linear movement to the piston,
wherein the actuator housing includes a mount portion configured to mount the electric brake actuator to a vehicle,
wherein the mount portion comprises:
a first boss portion and a second boss portion protruding toward left and right sides in a direction substantially perpendicular to an axial line of the cylinder mechanism; and
a third boss portion protruding downward from the cylinder mechanism and perpendicular to the first and second boss portions.

2. The electric brake actuator according to claim 1, wherein the actuator housing is configured to be divisible in two, on a plane substantially orthogonal with an axial line of the cylinder as a dividing plane.

3. A brake system for a vehicle, provided with an electric brake actuator that is communicated and connected with a master cylinder configured to generate a master cylinder pressure according to a braking operation by a driver, and generate a brake hydraulic pressure, based on an electric signal according to the braking operation, the electric brake actuator comprising:
a cylinder mechanism provided with a piston that is displaced along a hydraulic pressure chamber:
an electric motor configured to drive the piston; and
an actuator housing formed separable from the cylinder mechanism, wherein the actuator housing houses a gear mechanism configured to transmit a rotational driving force of the electric motor, and a conversion mechanism configured to convert the rotational driving force transmitted through the gear mechanism, into a linear movement and transmitting the linear movement to the piston,
wherein the actuator housing includes a mount portion configured to be mounted to allow the electric brake actuator to be supported,
wherein the mount portion comprises:
a first boss portion and a second boss portion protruding toward left and right sides in a direction substantially perpendicular to an axial line of the cylinder mechanism; and
a third boss portion protruding downward from the cylinder mechanism and perpendicular to the first and second boss portions.

* * * * *